No. 797,197. PATENTED AUG. 15, 1905.
A. GRAN.
WIND WHEEL.
APPLICATION FILED JUNE 8, 1904. RENEWED JAN. 19, 1905.
2 SHEETS—SHEET 1.
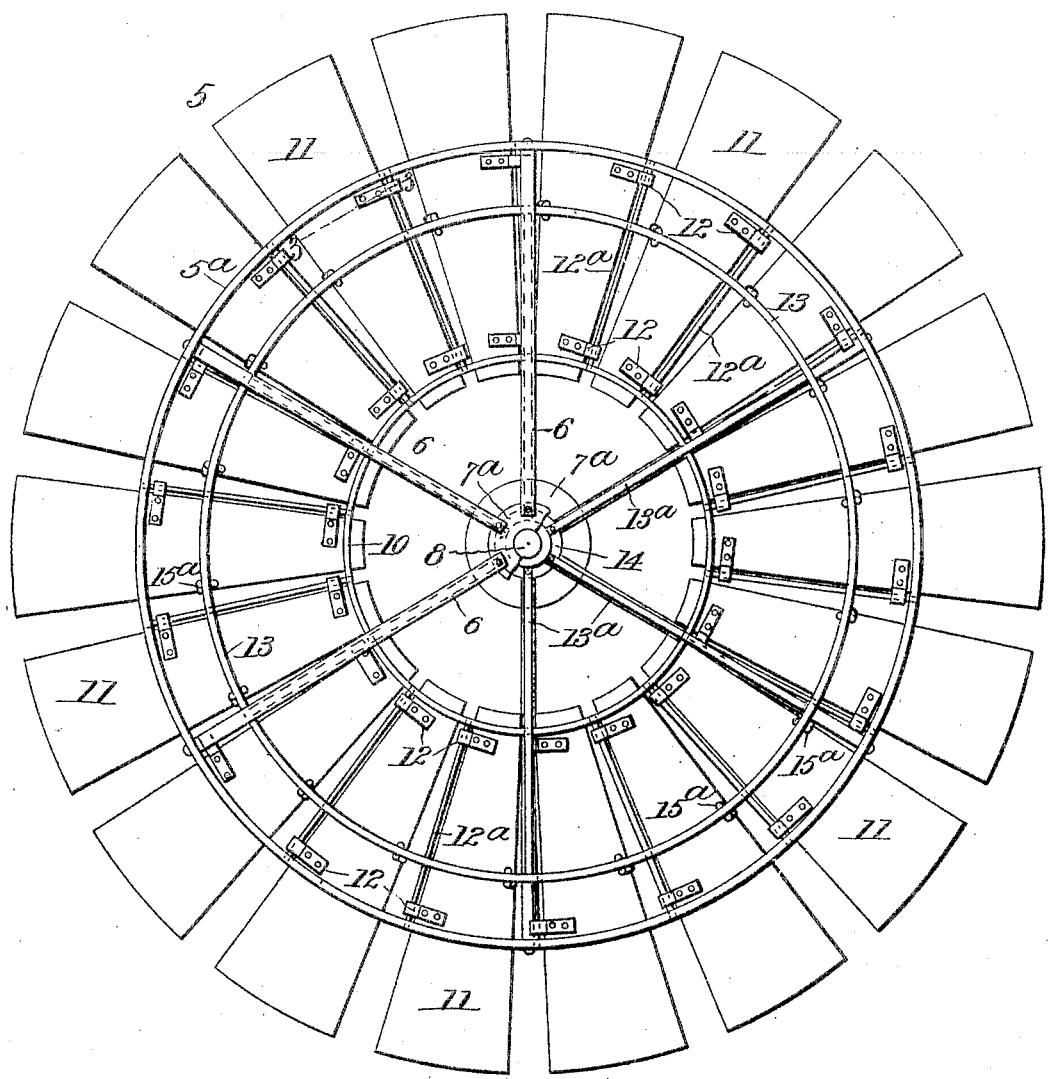

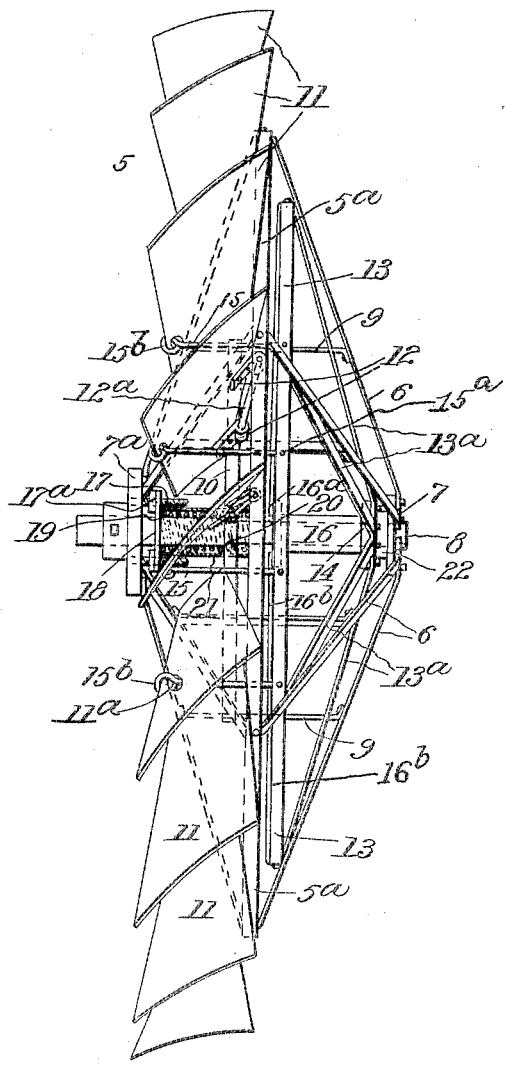

UNITED STATES PATENT OFFICE.

ALBERT GRAN, OF CHICAGO, ILLINOIS.

WIND-WHEEL.

No. 797,197. Specification of Letters Patent. Patented Aug. 15, 1905.

Application filed June 8, 1904. Renewed January 19, 1905. Serial No. 241,786.

*To all whom it may concern:*

Be it known that I, ALBERT GRAN, a citizen of the United States, residing at Chicago, in the county of Cook and State of Illinois, have invented new and useful Improvements in Wind-Wheels, of which the following is a specification.

My invention relates to wind-wheels, and has for its object to provide a governing mechanism whereby the angle of inclination of the wings to the wind is varied according to its force or velocity.

A further object is to provide a governing mechanism which shall be reliable in operation and very sensitive to the varying force or velocity of the wind to enable the same to run during high winds and storms without danger of damage.

Improved details of the construction and arrangement of the various parts of the invention will be apparent from the detailed description hereinafter and the appended claim when read in connection with the accompanying drawings, forming part thereof, in which—

Figure 1 is a front elevation, and Fig. 2 a side elevation, of the wind-wheel. Fig. 3 is a transverse section on a line 3 3 of Fig. 1.

Referring specifically to the drawings, 5 indicates the wind-wheel, having spokes 6 extending from spaced hubs 7 and $7^a$, respectively, which are fast on the shaft 8. The spokes are connected by cross-bars 9, which carry a ring 10, located to the rear of the rim $5^a$ of the wind-wheel. The wings 11 are secured by hinges 12 to rods $12^a$, extending between the wheel-rim $5^a$ and ring 10. For small wheels the rods $12^a$ need not be used, and the hinges can be secured to the rim $5^a$ and ring 10 in any other suitable manner. In front of the ring 10 and concentric therewith is a ring 13, which is connected by spokes $13^a$ to a sleeve $14^a$, slidably mounted on the shaft 8. Connecting-rods 15 extend from the rim or ring 13 to the wings, being hinged to the rim, as at $15^a$, and hooked to the wings, as at $15^b$, through holes $11^a$ therein near their outer edges. Each wing is connected to the wheel 13 in the same way. The sleeve is formed with a tubular portion 16, fitting on the shaft 8, and has at its rear end a peripheral flange $16^a$. Brace-rods $16^b$ extend from this flange to the rim 13.

The hub $7^a$ carries threaded stems 17, which extend loosely through a ring 18, which encircles the shaft 8 and is movable thereon. A spring 19 is coiled around the shaft between the flange $16^a$ and ring 18, the tension of which can be regulated by moving the ring 18 back and forth on the stems 17 by turning nuts $17^a$, screwed on the stems behind the disks.

The spring through the connection $16^a$, 16, 14, and 15 above described tends to push one wheel 13 forwardly and pull the wings into the wind. The tension of the spring will be so regulated that the wings will be held in the wind up to a predetermined velocity thereof. When this is exceeded, the spring will yield to allow the wings to be swung back on their hinges, decreasing the angle of inclination and consequently the pressure. When the wind slackens, the spring causes the opposite action. The extent to which the wings yield is proportionate to the force or velocity of the wind and if great enough they will be thrown out entirely. The action of the governing mechanism is instantaneous and sensitive and enables the mill to run during high winds and storms without danger of damage.

A shoulder 20 on the shaft 8 limits the movement of the sleeve 14 and prevents the wings from swinging back too far. A telescoping tube 21 covers the spring and protects it from snow, &c. The forward movement of the sleeve 14 is limited by a shoulder 22 on the shaft.

Having thus described my invention, what I claim as new, and desire to secure by Letters Patent, is—

The combination with the wind-wheel and its shaft, said wheel having hinged wings, of a sleeve slidable on the shaft, a rim concentric with the wind-wheel and supported on the sleeve and connected to the wings, threaded stems carried by the wind-wheel hub, a ring engaged by said stems and through which the shaft loosely extends, a spring coiled around the shaft between the sleeve, and the ring, and adjusting-nuts on the stems, behind the ring.

In testimony whereof I have signed my name to this specification in the presence of two subscribing witnesses.

ALBERT GRAN.

Witnesses:
ELSA PROSCHE,
H. G. BATCHELOR.